United States Patent Office 3,069,323
Patented Dec. 18, 1962

3,069,323
INSULIN RECOVERY PROCESS
Marguerite Volini and Milton A. Mitz, Chicago, Ill., assignors, by mesne assignments, to Armour Pharmaceutical Company, a corporation of Delaware
No Drawing. Filed Sept. 14, 1959, Ser. No. 839,603
6 Claims. (Cl. 167—75)

Our invention relates to a process for the preparation of crystalline insulin and more particularly our process relates to the use of aminocellulose anion exchangers in the preparation of crystalline insulin products.

To insure a maximum yield of insulin and enzymes, pancreatic tissue is excised from animals immediately after slaughter and frozen until the insulin and enzymes can be removed from the tissue.

There are several known procedures for removing insulin from the frozen tissue. U.S. Patent 2,826,534 discloses one such process. In this process, insulin is extracted from macerated pancreatic tissue with acidified aqueous ethanol, the extract is concentrated and the alcohol is removed from the solution by vacuum distillation. The insulin is precipitated from solution by salting with sodium chloride at a 30% concentration. The insulin salt cake is removed from the mother liquor by filtration and a second salt precipitation is carried out at a sodium chloride concentration of about 15%. This second salt cake is dissolved in water and the insulin precipitated therefrom at its isoelectric point. The insulin is then redissolved in water at a pH of about 2 to 4, the pH gradually elevated to a pH of from about 6.8 to about 10 and reduced gradually to a pH of from about 5.9 to about 5.3. At this point a relatively pure insulin can be recovered for further crystallization.

We have now discovered a process whereby this and other recovery processes can be simplified materially. Our process comprises utilizing an aminocellulose anion exchanger as an adsorbent in the recovery of insulin, eluting the insulin therefrom and recovering the insulin from the elution medium.

In carrying out our invention, an aqueous insulin-containing solution is contacted with an aminocellulose which can be in either the free base or anion cycle, at a pH of from about 5.5 to about 8.0, and more preferably at a pH of from about 6.0 to about 7.5 for a period of time sufficient to adsorb insulin on the anion exchanger. The adsorption of insulin on the anion exchanger is preferably carried out in the presence of anions. These anions may be buffers such as the anions of sodium potassium phosphate and ammonium acetate or they may be some other non-deleterious anion. We prefer to utilize sodium potassium phosphate as the added ion.

The aminocellulose exchangers utilized in our process are the cellulose exchangers having amine radicals chemically linked to the cellulose. Such links include ether and ester linkages. Exchangers which can be used in our invention include, for example, the reaction products of alpha cellulose and a compound such as 2-aminoethyl sulfuric acid, 2-chloroethylamine, 3-dimethylaminopropyl sulfuric acid, 2-chloropropylamine, 1,3-diamino-2-sulfatopropane sulfatemonohydrate, 2-(2-sulfatoethyl) pyridine, potassium (disulfatoethyl) amine monohydrate and sulfatoethylenediamine hydrochloride. Alternatively, the aminocellulose ion exchangers can be the reaction products of cellulose, including cellulose containing fabrics such as cotton, with epichlorohydrin and an amino alcohol such as ethanolamine. Furthermore, the ion exchangers can be iminized, for example the reaction product can be that of 2-aminoethoxy cellulose and 2-aminoethyl sulfuric acid which forms a partially iminized product. I would say quaternized aminocellulose may also be utilized as ion exchangers in our processes.

From the above it is evident that we intend the term aminocellulose to include cellulose to which has been attached a nitrogen containing radical which imparts ion exchanger properties to the cellulose.

Of the many aminocellulose ion exchangers, we prefer to utilize the tertiary amine substituted cellulose exchangers, particularly the lower dialkylamino lower alkoxy cellulose exchangers. We especially prefer to utilize the exchanger known as diethylaminoethyl cellulose.

After adsorption of the insulin, the aminocellulose is separated from the mother liquor by any of the known separatory procedures such as, for example, decantation, filtration or centrifugation. It is preferable to remove as much of the solvent as possible from the anion exchanger in order that any ions in the solution from which insulin is being adsorbed, do not react with the insulin eluting agent.

To elute the insulin, the cellulose is contacted with an acid at a pH of from about 1 to about 5, and preferably at a pH ranging from about 3.5 to about 4. Alternatively, the insulin may be contacted with the aminocellulose in the presence of a base at a pH of from about 8.5 to about 11, and preferably at a pH of from about 8.5 to about 9. The acid used can be any acid which will yield a desired hydrogen ion concentration such as, for example, sulfuric acid, hydrochloric acid, phosphoric acid, acetic acid and glutamic acid. Bases which are useful as eluants include ammonia, sodium hydroxide, calcium hydroxide, i.e., a hydroxyl ion supply base. We prefer to utilize ammonia as a basic eluant, and hydrochloric acid as an acidic eluant. As insulin must be soluble in the eluting medium, any eluting acid in which insulin is insoluble must be diluted with a solvent in which insulin is soluble. Of these solvents we prefer to utilize water.

Once the insulin is eluted from the diethylaminoethyl cellulose, it may be readily crystallized by procedures known to the art. We prefer to recover crystalline insulin by precipitating the insulin from the acidic eluant by the addition of a soluble zinc salt to precipitate the insulin as zinc insulinate. Other soluble heavy metal salts can be utilized as precipitants, however, according to known procedures. Alternatively, we prefer to precipitate the insulin with the salt of an alkali metal including ammonia, hydroxide and a hydrohalide, preferably sodium chloride, prior to finally precipitating insulin as the zinc salt. In carrying out the final crystallization step, it is advantageous to utilize a buffer such as sodium citrate, sodium potassium phosphate or ammonium acetate. However, this is not required.

The following examples more fully illustrate our invention, but it is not intended that our invention be limited to the exact procedures, buffers, acids, etc. utilized. Rather it is intended that all equivalents obvious to those skilled in the art be included within the scope of our invention as claimed.

*Example I*

To test the effectiveness of diethylaminoethyl cellulose as an insulin recovery agent, a mixture of 85% ethanol and 85% phosphoric acid was added to quick-frozen ground pancreas forming a 65% alcoholic extract having a ph of 2.8. The pancreatic tissue, after considerable stirring, was removed by centrifugation and reextracted with additional ethanol and phosphoric acid. The extracts were combined, adjusted to pH 8.3 with sodium hydroxide and filtered. The filtrate was acidified to pH 6 with sulfuric acid.

A quantity of diethylaminoethyl cellulose (0.5 meq. per gram) was regenerated with an excess of 0.1 N sodium hydroxide and washed to pH 7.0 with distilled water before use.

Six 500 ml. portions of acidic alcoholic extract containing an estimated activity of 0.96 unit of insulin per ml. were then mixed with 10, 15, 20, 25, 30 and 50 gram portions of the regenerated diethylaminoethyl cellulose which had been equilibrated with 0.1 N sodium potassium phosphate buffer, pH 7, and pulled dry to the cracking point prior to use. The aliquots of alcoholic insulin extracts containing the varying amounts of diethylaminoethyl cellulose were then thoroughly stirred, allowed to stand for a few minutes and filtered. Of the total insulin activity, 66, 75, 81, 86 and 95% respectively were adsorbed on the diethylaminoethyl cellulose from the aliquots of acidic alcoholic extract, as the amount of exchanger mixed with the 500 ml. of aliquot increased from 10 to 50 grams of diethylaminoethyl cellulose.

*Example II*

A 4,000 ml. portion of the alcoholic extract of Example I was treated with 144 grams of diethylaminoethyl cellulose as per Example I to obtain about a 75% adsorption of the insulin from the alcoholic solution. The diethylaminoethyl cellulose on which the insulin was adsorbed was dried to the cracking point, removed from the filter and suspended in 0.1 N hydrochloric acid in order to elute the insulin from the diethylaminoethyl cellulose. The mixture was thoroughly stirred, allowed to stand for several minutes and filtered. The ion exchanger was rewashed with dilute hydrochloric acid as necessary to insure complete elution. After filtration, the various dilute hydrochloric acid washes were adjusted to pH 3.5 with sodium hydroxide. Turbid eluates were clairified by centrifugation at pH 7.1. Distribution of the insulin obtained in the acid washes is set out in the following table:

| Eluate | Units/ml. | Insulin activity total units | Percent a |
|---|---|---|---|
| I | 3.78 | 3,370 | 98 |
| II | 0.11 | 100 | 3 |
| III | 0.005 | 50 | 1 | a Based on 3456 units as 100%. This value represents 75% of the total insulin in the acidic alcoholic extract.

*Example III*

The insulin in an aqueous acid eluate, containing about 2530 units of insulin and prepared by the processes of Examples I and II, was precipitated by the gradual addition of sodium chloride to the eluate to form a 20% salt solution. The precipitated insulin salt cake was dissolved in a minimum amount of 0.01 N hydrochloric acid and the insulin reprecipitated from the acid solution with a 12% concentration of sodium chloride. The second salt cake was removed from solution and redissolved in water and the insulin precipitated by adjustment of the pH to 5.2. This iso-electrically precipitated insulin was dissolved in a small amount of dilute hydrochloric acid and finally precipitated as the crystalline zinc salt by the addition of 16.5 ml. of acetone, 4 ml. of 1.2 M sodium citrate buffer (pH 5.6) and 0.8 ml. of zinc chloride (20% by weight) per 100 ml. of the acidic aqueous insulin solution. The solution pH was adjusted to pH 5.9 and set aside at 2° C. to allow crystal formation. The crystals thus obtained were separated by decantation and washed twice with distilled water and twice with acetone and dried under vacuum to yield 22 mg. of crystals having an activity of 25 units per mg. This product compared favorably with the U.S.P. reference standard requiring 24.2 units per mg.

*Example IV*

In an alternate crystallization procedure, 4 ml. of 1 M sodium citrate buffer and 0.8 ml. of zinc chloride (20% by weight) per 100 ml. of acidic aqueous eluate were added to a portion of the acidic eluate obtained by the process of Examples I and II. The solution was adjusted to about pH 5.9 and stored at 2° C. until crystallization was complete. The resulting crystals were separated by decantation and air dried without washing to yield a crystalline insulin having about 17 units per mg. activity.

*Example V*

To effect a continuous insulin recovery process, dimethylaminoethyl sulfuric acid is reacted with a sodium hydroxide treated cotton belting. The aminized belting is then sewed to form a continuous belt and arranged, by means of rollers, to pass into and out of a regeneration tank containing 0.1 N potassium hydroxide, a deionized water wash tank, a buffer tank containing 0.1 N sodium potassium phosphate, an adsorption tank containing the insulin containing solution, and an elution tank containing 0.1 N phosphoric acid. The belt is passed through rollers set to squeeze a major portion of fluid from the belting after the belt has passed through each of the buffer, adsorption and elution tanks. To effect a maximum efficiency, the fluid in each of the tanks is flowed against the belt in a direction countercurrent to the direction of the belt. The recovered eluant is crystallized continuously by the procedure of Example IV.

Now having described our invention what we claim is:

1. In a process for preparing crystalline insulin, wherein pancreas tissue is extracted with an aqueous acidic solution of a lower aliphatic alcohol to obtain a crude insulin extract, and wherein said crude insulin extract is subjected to purification to obtain crystalline insulin, the steps of contacting a solution of crude insulin with an aminocellulose anion exchanger at a pH of from about 5.5 to about 8.0 to fix at least a portion of the insulin on said anion exchanger, and contacting the aminocellulose having insulin fixed thereto with an eluant selected from the group consisting of an acid, at a pH of from about 1 to about 5, and a base, at a pH of from about 8.5 to about 11, to elute at least a portion of the insulin from said anion exchange.

2. In a process for preparing crystalline insulin, wherein pancreas tissue is extracted with an aqueous acidic solution of a lower aliphatic alcohol to obtain a crude insulin extract, wherein the crude insulin extract is prepared from residual pancreas tissue to obtain an alcoholic solution of crude insulin, and wherein said alcoholic solution of crude insulin is subjected to purification to obtain crystalline insulin, the steps of contacting said alcoholic solution of crude insulin with an aminocellulose anion exchanger to fix at least a portion of the insulin to said anion exchanger, and then contacting the anion exchanger having insulin fixed thereto with an eluant selected from the group consisting of an aqueous mineral acid solution, at a pH of from about 1 to about 5, and an aqueous hydroxide solution selected from the group consisting of aqueous alkali metal and alkaline earth metal hydroxide solutions, at a pH of from about 8.5 to about 11, to elute at least a portion of the insulin from said anion exchanger.

3. In a process for preparing crystalline insulin, wherein pancreas tissue is extracted with an aqueous acidic solution of a lower aliphatic alcohol to obtain a crude insulin extract, wherein the crude insulin extract is separated from residual pancreas tissue to obtain an alcoholic solution of crude insulin, and wherein said alcoholic solution of crude insulin is subjected to purification to obtain crystalline insulin, the steps of contacting said alcoholic solution of crude insulin with a dialkylaminoalkoxy cellulose anion exchanger at a pH of from about 6.0 to about 7.5 to fix at least a portion of the insulin to said anion exchanger, then contacting the anion exchanger having insulin fixed thereto with an eluant selected from the group consisting of an aqueous mineral acid solution, at a pH of from about 3.5 to 4.5, and an aqueous hydroxide solution selected from the group consisting of aqueous alkali metal and alkaline earth metal hydroxide solutions, at a pH of from about 8.5 to about 9.0, to elute at least a portion of the insulin from said anion exchanger and to obtain an aqueous solution of purified insulin, and then combining with said aqueous solution of purified insulin a soluble zinc salt at a pH of about 5.9 to obtain in the resulting aqueous suspension a precipitate of zinc insulinate.

4. The process of claim 3 in which said dialkylaminoalkoxy cellulose anion exchanger is a diethylaminoethyl cellulose anion exchanger.

5. In a process for preparing crystalline insulin, wherein pancreas tissue is extracted with an aqueous acidic solution of a lower aliphatic alcohol to obtain a crude insulin extract, wherein the crude insulin extract is separated from residual pancreas tissue to obtain an alcoholic solution of crude insulin, and wherein said alcoholic solution of crude insulin is subjected to purification to obtain crystalline insulin, the steps of contacting said alcoholic solution of crude insulin with a dialkylaminoalkoxy cellulose anion exchanger at a pH of from about 6.0 to about 7.5 to fix at least a portion of the insulin to said anion exchanger, then contacting the anion exchanger having insulin fixed thereto with an eluant selected from the group consisting of an aqueous mineral acid solution, at a pH of from 3.5 to 4.5, and an aqueous hydroxide solution selected from the group consisting of aqueous alkali metal, alkaline earth metal hydroxide solutions, at a pH of from about 8.5 to about 9.0 to elute at least a portion of the insulin from said anion exchanger and to obtain an aqueous solution of purified insulin, combining with the aqueous solution of purified insulin at least one salt of a mineral acid and an alkali metal, including ammonia, to obtain in the resulting aqueous suspension a precipitate of insulin, separating said precipitate of insulin from the supernatant liquid, forming an aqueous solution of said precipitate of insulin, adjusting the pH of the resulting aqueous solution to the isoelectric point of insulin to obtain therein an isoelectric precipitate of insulin, separating said isoelectric precipitate of insulin from the supernatant liquid, forming an aqueous solution of the isoelectric precipitate of insulin, and combining with the resulting aqueous solution a soluble zinc salt at a pH of about 5.9 to obtain in the resulting aqueous suspension a precipitate of zinc insulinate.

6. The process of claim 5 in which said dialkylaminoalkoxy cellulose anion exchanger is a diethylaminoethyl cellulose anion exchanger.

References Cited in the file of this patent

UNITED STATES PATENTS

| | | |
|---|---|---|
| 2,769,747 | Sampson | Nov. 6, 1956 |
| 2,878,159 | Jorpes | Mar. 17, 1959 |

FOREIGN PATENTS

Rambach: Proc. Soc. Exper, Biol. Med., vol. 98, No. 3, July 1958, pages 602–605.

Hoyer: Science, vol. 127, No. 3303, April 1958, pages 859–863.

Peterson and Sober: J.A.C.S., vol. 78, Feb. 20, 1956, pages 751, 752, 756, and 763.

Sober: J.A.C.S., vol. 76, Mar. 20, 1953, pages 1171–1172.

Guthrie: Ind. and Engineering Chem., vol. 144, No. 9, September 1952, pages 2187–2189.